United States Patent
Ito et al.

[11] 3,768,374
[45] Oct. 30, 1973

[54] ANGULAR ACCELERATION SENSOR
[75] Inventors: Shin Ito; Fmihiro Ushijima, both of Toyota-shi, Japan
[73] Assignee: Toyota Jidosha Kogyo Kabushiki Kaisha, Toyota-shi, Aichi-Ken, Japan
[22] Filed: Jan. 28, 1972
[21] Appl. No.: 221,518

[30] Foreign Application Priority Data
Mar. 2, 1971   Japan.............................. 46/10393

[52] U.S. Cl....................... 91/419, 73/510, 73/515, 137/38
[51] Int. Cl. ........................................... G05d 13/34
[58] Field of Search .................. 91/419; 137/38, 39, 137/40, 45, 46; 180/104; 244/78, 80; 303/24 R, 24 A, 24 B, 24 BB, 24 C, 24 F; 73/505, 510, 515

[56] References Cited
UNITED STATES PATENTS
3,278,139   10/1966   Borcher et al.................... 73/515 X
3,513,710   5/1970   Bates et al. ....................... 73/515 X Primary Examiner—Robert G. Nilson
Attorney—Toren & McGeady

[57] ABSTRACT

An angular acceleration sensor comprising two inertia bodies located at opposed positions with respect to the axis of rotation of an angular acceleration to be sensed and movable in a direction tangent to the circumference of such rotation; valve mechanisms operated in response to movement of said inertia bodies for deriving fluid pressure signals in accordance with the direction of motion of said inertia bodies, fluid elements for cancelling acceleration components other than the angular acceleration of rotation about said axis of rotation, gate valve means for deriving a signal corresponding to the average of fluid pressure signals input thereto, and an additional fluid element for operating an actuator proportionally with applied fluid pressure signals representative of the angular acceleration of rotation to be sensed.

6 Claims, 4 Drawing Figures

PATENTED OCT 30 1973 3,768,374

ANGULAR ACCELERATION SENSOR

BACKGROUND OF THE INVENTION

This invention relates to an angular acceleration sensor, and more particularly to a sensor of rotational acceleration for controlling the posture of automobiles, airplanes or the like in cases where rotational displacement such as yawing or the like occurs.

In order to cope with situations where the braking forces to left and right vehicular wheels become uneven, due to disturbances such as, for example, a wind gust, and controllability is lost by oscillating phenomenon due to yawing, a so-called adapting steering method has been proposed in which the rate of rotation of yawing is sensed and changes in the posture of wheels is corrected in conjunction with the power steering system regardless of the driving operation.

Hitherto, gyro or vortex type fluid elements have been utilized in angular acceleration sensors for controlling steering when yawing is encountered. The gyro type fluid element, however, is too high in cost and its durability leaves much to be desired, because the life of bearings used therein is short. The vortex type fluid element has many disadvantages such as low sensitivity, low output level and high consumption of operating fluid.

In view of the foregoing, an object of this invention is to provide a sensor for angular acceleration of rotation which is simple in construction and can be manufactured at low costs but ensures accurate sensing with high output and decreased consumption of operating fluid.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
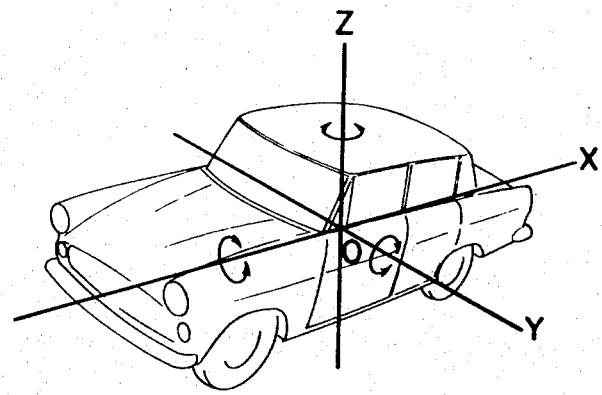
FIG. 1 is a view in perspective of an automobile used to describe the directions of force acting thereupon.

Referring to FIG. 1, the longitudinal direction is represented by the X axis, the lateral direction by the Y axis, and the vertical direction by the Z axis with the center of gravity of a vehicle body shown at O. The axes intersect perpendicularly to each other and it will be apparent that there will usually occur six basic types of motions; that is, motion parallel to the three axes, rolling motion rotating about the X axis, pitching motion rotating about the Y axis and yawing motion rotating about the Z axis. The embodiments of this invention provide sensors which are responsive only to the angular acceleration of yawing about the Z axis and are not affected by the acceleration components developed by other motions.

Figure 2:
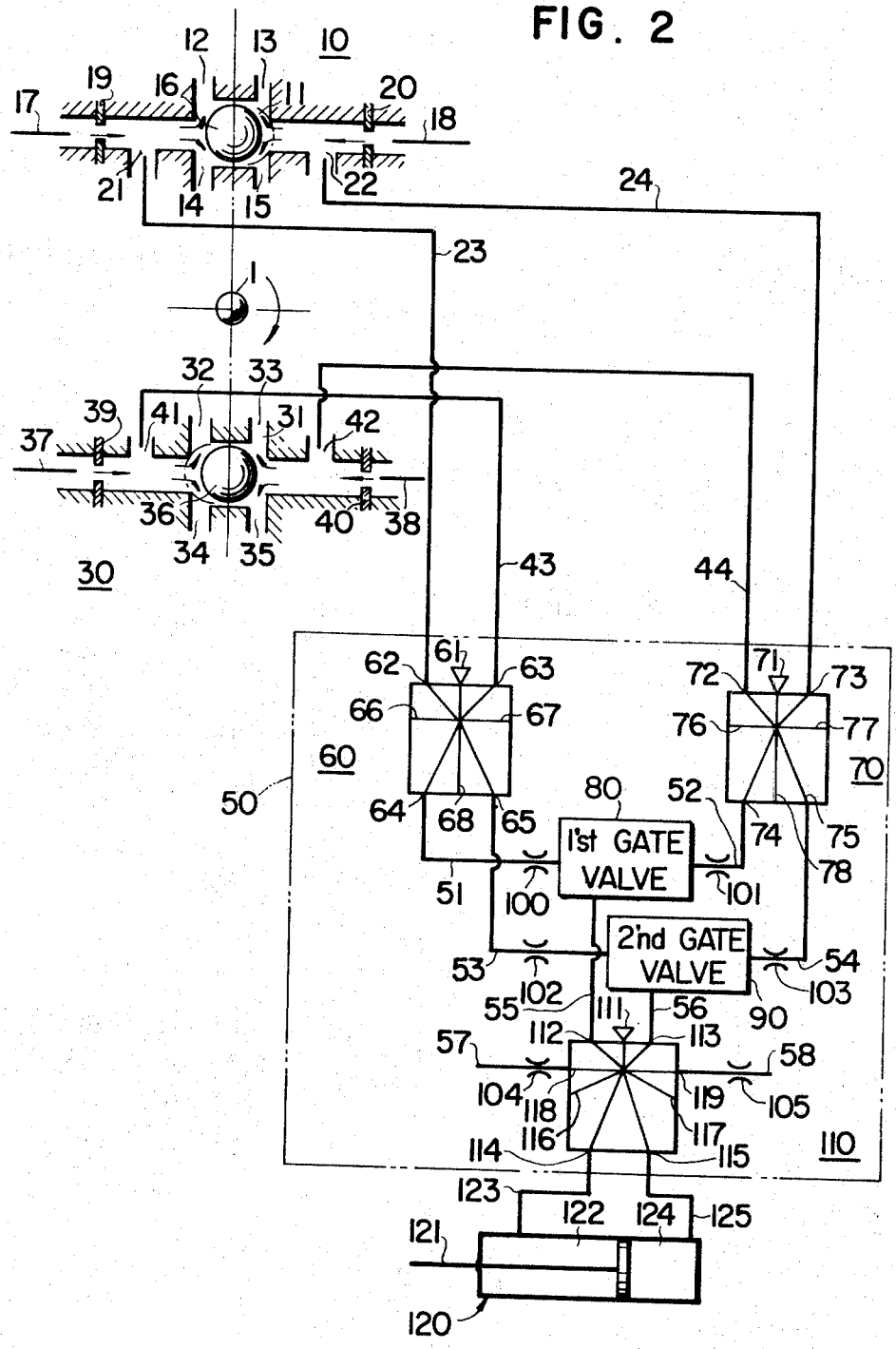
FIG. 2 is a schematic circuit diagram of a sensor according to the present invention.

Referring now to FIG. 2, a first valve mechanism 10 and a second valve mechanism 30 of the same construction are arranged at positions opposite to each other, for example, at symmetrical positions with respect to an axis of rotation 1 which represents the Z axis, and spaced therefrom equivalent distances in the direction of the X axis intersecting at right angles said axis of rotation 1. The valves 10 and 30 are provided with four pressure discharge ports 12 through 15 and 32 through 35, respectively, in their respective chambers 11 and 31, said four pressure discharge ports being arranged at symmetrical positions. Moreover, said valves 10 and 30 are provided with inertia bodies 16 and 36, respectively, which are movable in the direction of the Y axis intersecting at right angles the X axis and prependicular to the axis of rotation 1. Furthermore, the valves 10 and 30 are respectively provided with passages 17, 18 and 37, 38 at both lateral sides of the chambers 11 and 31, and fluid pressures are supplied into said passages through orifices 19, 29 and 39, 40. The passages also include output ports 21, 22 and 41, 42, respectively.

In the valve 10, the same fluid pressure is supplied into the passages 17 and 18. In a case when no inertia force developed by acceleration due to motion is applied to the inertia body 16, or in a case when acceleration components exist but they are not applied in the direction of the Y axis, the inertia body 16 remains at a central position within the chamber 11. At this time, the fluid pressure admitted from the passage 17 or 18 is discharged from the pressure discharge ports 12 through 15, thus developing no fluid pressure at the output ports 21 and 22. When the inertia force due to acceleration is applied in the direction of the Y axis, the inertia body 16 is moved to the left or right in accordance with the direction of application of said inertia force, thus closing the passage 17 or 18 on the side to which the inertia body 16 has been moved. Consequently, a fluid pressure is developed at the output port 21 or 22 on the closed side. The valve 30 is operated in the ssme manner. As a result, referring to the motions shown in FIG. 1, the motions due to accelerations in the directions of the X and Z axes, and the motion due to rotation about the Y axis, do not operate to move the inertia body 16 in the direction of the Y axis, thus excluding the sensing of such motions. However, fluid pressure is developed by rotation about the X and Z axes and due to acceleration components in the direction of the Y axis, thus making the device sensitive to these types of motion.

Thus, half of the six motions of a vehicle body can be excluded from sensing by means of the configurations of the valves 10 and 30 and their location with respect to the axis of rotation 1. However, two more acceleration components must be eliminated in order that the device will only sense the angular acceleration of rotation about the Z axis. For this purpose, a fluid pressure calculating circuit 50 is provided.

The fluid pressure calculating circuit 50 comprises two fluid elements 60 and 70 having the characteristics of proportional type elements, and being of the same construction. Fluid elements 60 and 70 comprise input ports 61 and 71, control ports 62, 63 and 72, 73, output ports 64, 65 and 74, 75 and pressure discharge ports 66, 67, 68 and 76, 77, 78, respectively. In the first fluid element 60, the output port 21 of the first valve 10 is connected to the control port 62 through a passage 23, and the output port 41 of the second valve 30 is connected to another control port 63 through a passage 43. In the second fluid element 70, another output port 42 of the second valve 10 is connected to another control port 73 through a passage 24. Thus, both fluid elements 60 and 70 are operated in the same manner. Therefore, the operation of said fluid elements will be described with reference to the fluid element 60. When a signal exists at the control port 62 and 63, an output corresponding to said signal is developed at the output port 65 or 64. If there is no difference between the signals at the control ports 62 and 63, there will be no difference between the outputs at the output ports 64 and 65. Conversely, if there is a difference between the signals at the control ports 62 and 63, an output corresponding to said difference will be developed at the output ports 64 and 65. Consequently, in view of the above-described relationship between the valves 10 and 30, both inertia bodies 16 and 36 are moved to one side in the case of motion in the direction of the Y axis, or rotation about the X axis, thus developing signals representing fluid pressure at the output ports 21, 41 or 22, 42. These signals are cancelled by each other at the fluid element 60 or 70. In the case of the motion due to rotation about the Z axis, the inertia bodies 16 and 36 are moved in opposite directions, thus developing fluid pressure signals at the output port 21 of the first valve 10 and the output port 42 of the second valve 30, or at the output port 22 of the first valve 10 and the output port 41 of the second valve 30. Thus, outputs are derived at the output ports 65, 75 or 64, 74 by means of the fluid elements 60 and 60.

The fluid pressure calculating circuit 50 further comprises two gate valves 80 and 90. The output port 64 of the first fluid element 60 is connected to one of the input sides of the first gate valve 80 through a passage 51 having a throttle 100. The output port 74 of the second fluid element 70 is connected to another input side of the gate valve 80 through a passage 52 having a throttle 101. The output port 65 of the first fluid element 60 is connected to one of input sides of the second gate valve 90 through a passage 53 having a throttle 102. The output port 75 of the second fluid element 70 is connected to another input side of the gate valve 90 through a passage 54 having a throttle 103. Thus, both gate valves 80 and 90 are operated in conjunction with the throttles 100 and 103 to develop a signal corresponding to the mean value of both inputs. In the case of clockwise rotation about the Z axis, the output ports 64 and 74 of the fluid elements 60 and 70 derive outputs, thus actuating the first gate valve 80. In the case of counterclockwise rotation, the output ports 65 and 75 of the fluid elements 60 and 70 derive the outputs, thus actuating the second gate valve 90.

The fluid pressure caclulating circuit 50 further comprises a third fluid element 110 having the same proportional characteristics as said fluid elements 60 and 70. The fluid element 110 comprises an input port 111, control ports 112, 113, output ports 114, 115, pressure discharge ports 116, 117 and adjusting ports 118, 119. The output side of the first gate valve 80 is connected to the control port 112 through a passage 55. The output side of the second gate valve 90 is connected to the control port 113 through passage 56. Passages 57 and 58 having orifices 104 and 105, respectively, are connected to the adjusting ports 118 and 119. The third fluid element 110 is provided with an actuator 120 which is operated in response to the sensed angular acceleration of rotation. Said actuator 120 is provided with a piston 121. A chamber 122 of said actuator 120 is connected to the output port 114 of the third fluid element 110 through a passage 123, and another chamber 124 is connected to the output port 115 through a passage 125. Thus, in the third fluid element 110, the output at the output port 114 becomes equal to the output at the output port 115 in the case where the fluid pressure is applied to both adjusting ports 118 and 119 and the angular acceleration of rotation about the Z axis is eliminated by adjusting the orifices 104 and 105, thus preventing erroneous operation due to the variations in the manufacture of the fluid elements 60, 70 and other components. When a signal is passed to the control port 112 by the action of the first gate valve 80, an output is derived at the output port 115, thus moving the piston 121 of the actuator 120 to the left. When a signal is passad to the other control port 113 by action of the second gate valve 90, the piston 121 is moved to the right by the output derived at the output port 114. The angular acceleration of rotation about the Z axis is sensed by means of the fluid pressure calculating circuit 50 of the above-described construction. The overall operation will be described hereinbelow.

When an angular acceleration of rotation of $d^2\theta/dt^2$ is developed in a direction of clockwise rotation about the axis of rotation 1 at the z axis, an inertia force of $m.l.\ d^2\theta/dt^2$ ($m$ = mass of inertia body, $l$ = distance between the axis of rotation at the center of gravity and the inertia body) is applied to the inertia bodies 16 and 36 of both valves 10 and 30 in opposite directions. Consequently, a fluid pressure of $1/A.\ m.l.\ d^2\theta/dt^2$ ($A$ = cross-sectional area of the passage 18 and 37) is derived at the output ports 22 and 41, respectively. The signal corresponding to said fluid pressure is passed to the control ports 63 and 73 of the first and second fluid elements 60 and 70, thus deriving an output of $\alpha.1/A.\ M.\ d^2\theta/dt^2$ ($\alpha$ = constant or proportionality of the fluid element) at the output ports 64 and 74. These outputs are applied to the first gate valve 80 and are added to develop an output of $\alpha\cdot\beta\cdot 1/A\cdot m\cdot l\cdot d^2\theta/dt^2$ ($\beta$ = constant determined by the characteristic of the gate valve) at the output side. This output is applied to the control port 112 of the third fluid element 110. Finally, an output of $\alpha\cdot\beta\cdot\gamma\cdot 1/A\cdot m\cdot l\cdot d^2\theta/dt^2$ ($\gamma$ = constant of proportionally of the fluid element) is derived at the output port 115 of the third fluid element 110. The piston 121 of the actuator 120 is moved to the left by means of said fluid pressure signal. Conversely, if the angular acceleration in the direction of counterclockwise rotation about the Z axis is developed, the piston 121 of the actuator 120 is moved to the left by means of the fluid pressure proportional to said angular acceleration of rotation.

Not only in the case where no acceleration component acting in the direction of the Y axis is applied to the inertia bodies 16 and 36, but also in the case where acceleration components other than the angular acceleration of rotation about the axis of rotation 1 are developed, they are cancelled by the fluid elements 60 and 70, and therefore the actuator 120 is not operated. In a case where said acceleration components and the angular acceleration of rotation about the axis of rotation 1 of $d^2\theta/dt^2$ are simultaneously developed, the actuator 120 is operated in accordance with the angular acceleration of rotation about the axis of rotation 1 without being affected by other acceleration components.

Figure 3:
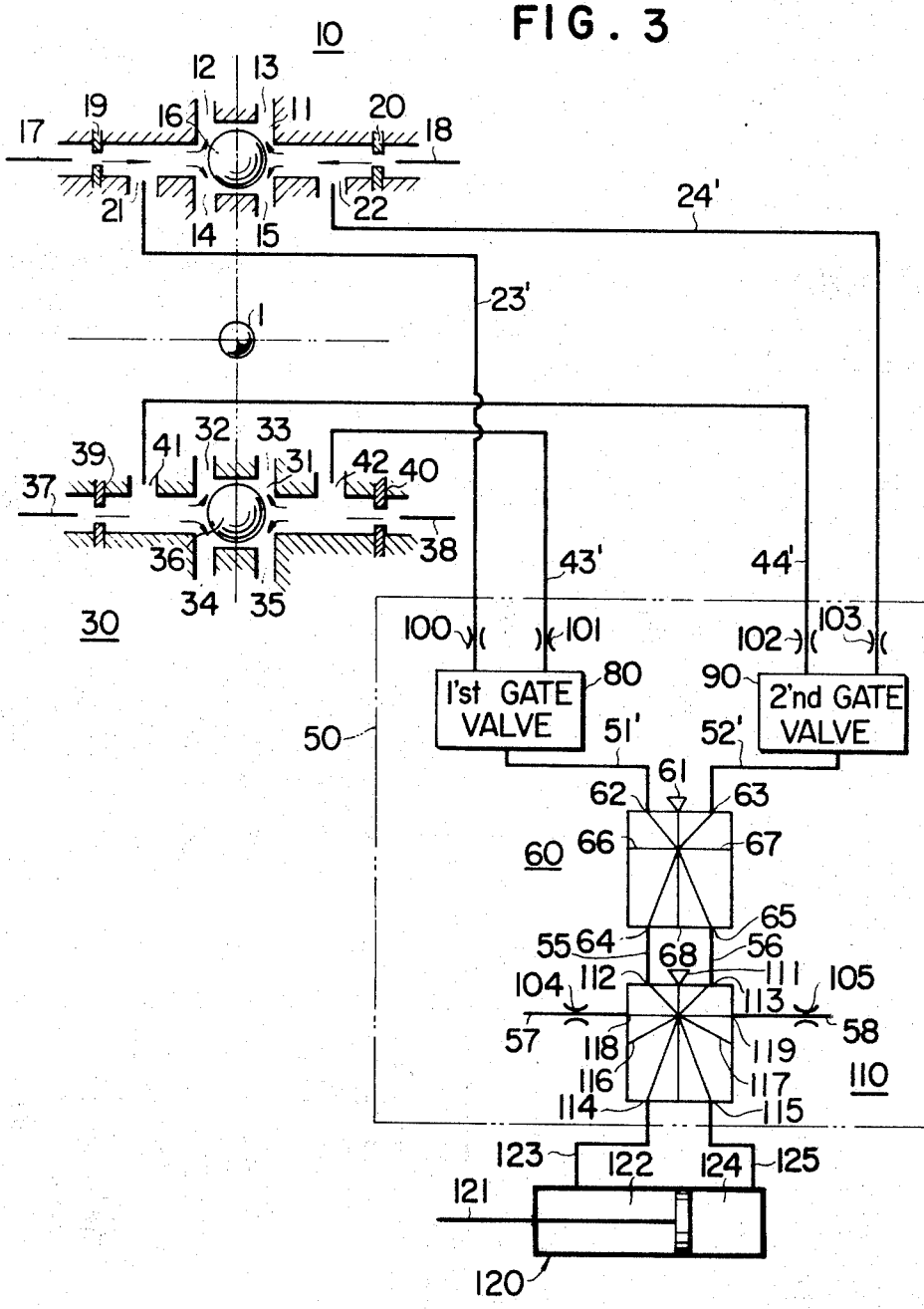
FIG. 3 is a schematic diagram of a modified embodiment of the sensor of FIG. 2.

In addition to the first embodiment as described above, this invention proposes a second embodiment which is illustrated in FIG. 3. Referring now to FIG. 3, the axis of rotation 1 and the valves 10 and 30 are constructed in the same manner as the embodiment illustrated in FIG. 2. Two gate valves 80 and 90 are provided in the fluid pressure calculating circuit 50. The output port 21 of the first valve 10 is connected to the input side of the first gate valve 80 through a passage 23' having the throttle 100. The output port 42 of the second valve 80 is also connected to the input side of the first gate 80 through a passage 43' having the throttle 101. The output port 41 of the second valve 30 is connected to the input side of the second gate valve 90 through a passage 44' having the throttle 102. The output port 22 of the first valve 10 is also connected to the input side of the second gate valve 90 through a passage 24' having a throttle 103. The output sides of the above-described gate valves 80 and 90 are respectively connected to the control ports 62 and 63 of the single fluid element 60 through passages 51' and 52'. The output ports 64 and 65 of said fluid element 60 are connected through the passages 55 and 56 to the fluid element 110 of the same construction as the one shown in FIG. 2.

When the angular acceleration of rotation about the axis of rotation 1 is developed, this embodiment is operated in a reverse manner as the above-described first embodiment. First, the fluid pressure signals produced in the valves 10 and 30 are averaged by means of the gate valves 80 or 90. Then, this signal is applied through the fluid elements 60 and 110 to the actuator 120. At this time, the gate valves 80 and 90 do not perform averaging of the acceleration components other than the one about the axis of rotation. The fluid pressure is applied to the fluid element 60 and is cancelled by the characteristic of said fluid element 60.

Figure 4:
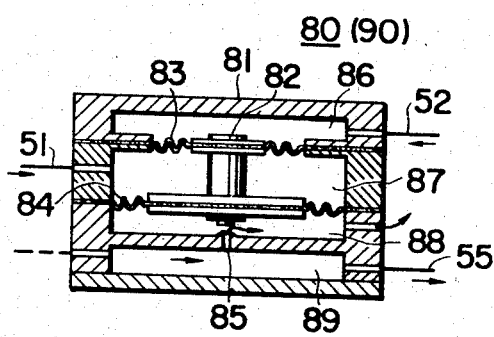
FIG. 4 is a sectional view of a gate valve mechanism.

Concerning the gate valves 80 and 90, the diaphragm type gate valve as shown in FIG. 4 may be employed in the embodiments in which the above-described throttles are used in combination. Referring now to FIG. 4, the first diaphragm type gate valve 80 will be described. A body 81 is divided into four chambers 86 through 89 by means of a nozzle 85 and first and second diaphragms 83 and 84 which are integrally connected by means of a shaft 82. The first and second chambers serve as the input side, to which the passages 51 and 52 as shown in the embodiment of FIG. 2 are connected. The third chamber 88 serves as the pressure discharge side. The fourth chamber 89 acts as the output side. The fluid pressure is supplied into the one side of said fourth chamber 89, and the passage 55 is connected to another side thereof. Thus, the input is applied to the first and second chambers 86 and 87, and the pressure is discharged from the nozzle 85 by the displacement of the first and second diaphragms 83 and 84 in accordance with said input. At the same time, the output fluid pressure of the passage 55 is determined. In this case, the output fluid pressure is proportional to $A_{83}(P_{86} - P_{87}) + A_{84} \cdot P_{87}$, wherein $P_{86}$ is the fluid pressure in the first chamber 86; $P_{87}$, the fluid pressure in the second chamber 87; $A_{83}$, the area of the first diaphragm 83; and $A_{84}$, the area of the second diaphragm. If there exists the relationship $A_{83} = \frac{1}{2} A_{84}$ between the areas $A_{83}$ and $A_{84}$ of the first and second diaphragms 83 and 84, the output fluid pressure will be proportional to $P_{86} + P_{87}$. Thus, a signal corresponding to the average of the two inputs will be derived in the same manner as described hereinbefore.

As described above, in the angular acceleration sensor of this invention, two inertia bodies 16 and 36 are provided at opposite positions with respect to the axis of rotation 1 of the angular acceleration to be sensed so that they are movable in directions tangent to the circumference of rotation. The valves 10 and 30 adapted to derive the fluid pressure signal in accordance with the movement of said inertia bodies 16 and 36 are all that need be provided. Furthermore, the fluid elements 60, 70, 110, gate valves 80, 90 for calculating fluid pressure signals and other component parts are provided, thus making it possible to sense the angular acceleration of rotation about the axis of rotation 1. Oil pressure or pneumatic pressure can be used as the fluid pressure in these embodiments. While the operation of the embodiments has been described by taking yawing of an automobile as the angular acceleration of rotation to be sensed, this invention may be applied to sensing rolling and pitching by changing the axis of rotation from the Z axis to the X or Y axis. Furthermore, this invention may be applied to airplanes. As the embodiment of this invention is simple in construction and comprises a calculating circuit, its useable life is lengthened and the manufacturing cost can be reduced as compared with the conventional gyrotype sensors. Moreover, this invention is more advantageous than the sensors employing eddy-current type elements.

While specific embodiments of the invention have been shown and described in detail to illustrate the application of the inventive principles, it will be understood that the invention may be embodied otherwise without departing from such principles.

What is claimed is:

1. An angular acceleration sensor for sensing movement of an object about a predetermined axis of rotation comprising:
   a pair of valves each containing an inertia body positioned on opposite sides of said axis and located on a line extending perpendicularly to said axis,
   each of said inertia bodies being movable upon motion of said object to control fluid flow through said valves to derive fluid pressure signals therefrom representative of the motion of said object,
   said inertia bodies being arranged to effect, upon rotation of said object about said predetermined axis, pressure signals which are different from pressure signals occurring as a result of other types of motion of said object;
   fluid logic means receiving said fluid pressure signals from said valves and operable to distinguish pressure signals occurring as a result of rotation of said object about said predetermined axis from other pressure signals; and
   actuator means operated in response to the fluid pressure received from said logic means to effect control functions upon rotation of said object about said predetermined axis;
   said valves comprising a fluid pressure input source, a pair of conduit means for each of said valves, with the positions of said inertia bodies being operative to effect selective application of fluid pressure flow to said logic means through either one or the other of said pair of conduit means, and fluid pressure vent ports for venting said fluid pressure input to divert pressure flow from said conduit means, said inertia bodies being movable as a result of movement of said object to selectively close and open said vent ports to control application of fluid pressure flow to said fluid logic means.

2. A sensor according to claim 1 wherein said fluid pressure vent ports are located in opposed relationship on either side of said line extending perpendicularly to said predetermined axis.

3. A sensor according to claim 1 wherein said inertia bodies are operative to close said vent ports only upon movement of said inertia bodies in a direction tangential to the circumference of rotation of said object about said predetermined axis.

4. A sensor according to claim 1 wherein said inertia bodies are movable tangentially to said circumference of rotation of said body about said predetermined axis in two opposed directions, with movement in one of said directions being operative to effect application of fluid pressure flow through one of said pair of conduit means, and with movement in the opposite direction through the other of said pair of conduit means.

5. A sensor according to claim 4 wherein said fluid logic means are arranged to effect application of a pressure signal for operation of said actuator means in response to rotation of said object about said predetermined axis when said inertia bodies of each of said valves move in opposed directions tangentially of said circumference of rotation.

6. A sensor according to claim 4 wherein said fluid logic means are arranged to avoid application of a pressure signal to said actuator means when said inertia bodies of each of said valves move in the same direction tangentially of said circumference of rotation of said object about said predetermined axis.

* * * * *